United States Patent
Dou et al.

(10) Patent No.: US 11,201,553 B2
(45) Date of Patent: Dec. 14, 2021

(54) CONTROL METHOD AND CONTROL CIRCUIT FOR SWITCHING POWER SUPPLY CIRCUIT, AND SWITCHING POWER SUPPLY CIRCUIT

(71) Applicant: Joulwatt Technology (Hangzhou) Co., LTD., Hangzhou (CN)

(72) Inventors: Xunjin Dou, Hangzhou (CN); Aimin Xu, Hangzhou (CN); Xunwei Zhou, Hangzhou (CN)

(73) Assignee: JOULWATT TECHNOLOGY (HANGZHOU) CO., LTD., Hangzhou (CN)

(*) Notice: Subject to any disclaimer, the term of this patent is extended or adjusted under 35 U.S.C. 154(b) by 110 days.

(21) Appl. No.: 16/699,670

(22) Filed: Dec. 1, 2019

(65) Prior Publication Data
US 2021/0058001 A1 Feb. 25, 2021

(30) Foreign Application Priority Data
Aug. 21, 2019 (CN) .......................... 201910775984.3

(51) Int. Cl.
*H02M 3/335* (2006.01)
*H02M 3/158* (2006.01)
*H02M 1/088* (2006.01)
*H02M 1/38* (2007.01)

(52) U.S. Cl.
CPC ..... *H02M 3/33592* (2013.01); *H02M 3/1588* (2013.01)

(58) Field of Classification Search
CPC ...... H02M 3/1588; H02M 1/08; H02M 1/088; H02M 2001/0051; H02M 2001/0029; H02M 1/38; H02M 3/158; H02M 3/33592
See application file for complete search history.

(56) References Cited

U.S. PATENT DOCUMENTS

| | | | | |
|---|---|---|---|---|
| 6,841,977 B2* | 1/2005 | Huang | ................ | H02M 3/1588 323/224 |
| 10,886,853 B1* | 1/2021 | Xu | ......................... | H02M 1/38 |
| 2006/0192589 A1* | 8/2006 | Okazaki | ............... | H03K 17/163 326/112 |
| 2006/0226819 A1* | 10/2006 | Xu | ........................ | H02M 3/338 323/268 |
| 2008/0084197 A1* | 4/2008 | Williams | ................ | H02M 1/38 323/282 |

(Continued)

*Primary Examiner* — Sisay G Tiku
(74) *Attorney, Agent, or Firm* — Bayramoglu Law Offices LLC

(57) ABSTRACT

A control method and a control circuit for a switching power supply circuit and the switching power supply circuit. The switching power supply circuit includes a main switching transistor, a synchronous rectifier and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect and timing is started. When a gate voltage of the main switching transistor is detected to rise to a first voltage or the timing reaches a first time, the gate voltage of the synchronous rectifier is pulled down to the zero voltage.

8 Claims, 5 Drawing Sheets

(56) References Cited

U.S. PATENT DOCUMENTS

| | | | |
|---|---|---|---|
| 2016/0209853 A1* | 7/2016 | Deboy | H02M 1/08 |
| 2018/0212528 A1* | 7/2018 | Tang | H02M 3/33592 |
| 2019/0238129 A1* | 8/2019 | Fukushima | H03K 17/163 |
| 2019/0363626 A1* | 11/2019 | Takano | H03K 17/687 |
| 2020/0177090 A1* | 6/2020 | Braz | H02M 3/33592 |

* cited by examiner

CONTROL METHOD AND CONTROL CIRCUIT FOR SWITCHING POWER SUPPLY CIRCUIT, AND SWITCHING POWER SUPPLY CIRCUIT

CROSS REFERENCE TO THE RELATED APPLICATIONS

This application is based upon and claims priority to Chinese Application No. 201910775984.3, filed on Aug. 21, 2019, the entire contents of which are incorporated herein by reference.

TECHNICAL FIELD

The present invention relates to the technical field of power electronics. More specifically, the present disclosure relates to a control method and a control circuit for a switching power supply circuit, and the switching power supply circuit.

BACKGROUND

In switching power supplies, in order to improve system efficiency, a free-wheeling diode is replaced by a synchronous rectifier. However, when the synchronous rectifier is turned off and a main switching transistor is turned on, it is necessary to add dead time in order to prevent a shoot-through. During the dead time, the main switching transistor has not been turned on, the synchronous rectifier has been turned off, and a current passes through a body diode of the synchronous rectifier. When the main switching transistor is turned on, there is a reverse recovery current caused by turning the body diode of the synchronous rectifier on. This reverse recovery current causes a relatively large switching loss. Therefore, how to improve and optimize a switch process of turning the synchronous rectifier off, turning the main switching transistor on, is an urgent problem to be solved in the switching power supplies.

SUMMARY

In view of this, an objective of the present invention is to provide a control method and a control circuit for a switching power supply circuit, and the switching power supply circuit, which are used to solve the problem of a turn-on of a body diode of a synchronous rectifier at the time from the synchronous rectifier being turned off to a main switching transistor being turned on and thereby reducing system efficiency in the prior art.

A technical solution of the present invention is to provide a method for controlling a switching power supply circuit. The switching power supply circuit includes a main switching transistor, a synchronous rectifier and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and timing is started. When a gate voltage of the main switching transistor is detected to rise to a first voltage or the timing reaches a first time, the gate voltage of the synchronous rectifier is pulled down to the zero voltage.

Alternatively, when the switching signal indicates that the synchronous rectifier is turned from on to off, and the main switching transistor is turned from off to on, the gate voltage of the synchronous rectifier is pulled down to be close to and lower than the threshold voltage of the synchronous rectifier.

Alternatively, a gate of the synchronous rectifier is connected to a reference ground through a circuit formed by a first transistor and a second transistor connected in series, and the gate of the synchronous rectifier is connected to a control terminal of the first transistor through a first resistor.

Alternatively, a first capacitor is connected in parallel with the first resistor, or an anode of a first diode is connected to the control terminal of the first transistor and a cathode of the first diode is connected to the gate of the synchronous rectifier.

Another technical solution of the present invention is to provide a circuit for controlling a switching power supply circuit. The switching power supply circuit includes a main switching transistor, a synchronous rectifier and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and timing is started. When a gate voltage of the main switching transistor is detected to rise to a first voltage or the timing reaches a first time, the gate voltage of the synchronous rectifier is pulled down to the zero voltage.

Alternatively, a synchronous rectifier driving circuit is included. The synchronous rectifier driving circuit includes a first transistor, a second transistor, a first resistor and a driving amplifying circuit. The gate of the synchronous rectifier is connected to a reference ground through a circuit formed by the first transistor and the second transistor connected in series, and the gate of the synchronous rectifier is connected to a control terminal of the first transistor through the first resistor.

Alternatively, the synchronous rectifier driving circuit further includes a first capacitor or a first diode. The first capacitor is connected in parallel with the first resistor, or an anode of the first diode is connected to the control terminal of the first transistor and a cathode of the first diode is connected to the gate of the synchronous rectifier.

Alternatively, the synchronous rectification driving circuit further includes a delay circuit and a pull-down circuit. The delay circuit receives a switching signal, and the pull-down circuit receives an output voltage of the delay circuit and pulls down the gate of the synchronous rectifier according to the output voltage of the delay circuit. When the switching signal indicates that the synchronous rectifier is turned from on to off, and the main switching transistor is turned from off to on, the delay circuit delays the first time, and the pull-down circuit pulls down the gate of the synchronous rectifier.

Alternatively, the synchronous rectification driving circuit further includes a comparison circuit and a pull-down circuit. The comparison circuit receives a driving signal of the main switching transistor, and the pull-down circuit receives an output voltage of the comparison circuit and pulls down the gate of the synchronous rectifier according to the output voltage of the comparison circuit. When the comparison circuit detects that a driving voltage of the main switching transistor is higher than a first driving voltage, the pull-down circuit pulls down the gate of the synchronous rectifier.

Another technical solution of the present invention is to provide a switching power supply circuit.

Compared with the prior art, the circuit structure and method of the present invention have the following advantages. The conduction of the body diode of the synchronous rectifier is reduced at the time from the synchronous rectifier being turned off to the main switching transistor being turned on, the switching loss is reduced and the conversion efficiency is improved.

DETAILED DESCRIPTION OF THE EMBODIMENTS

The preferred embodiments of the present invention are described in detail below with reference to the drawings, but the present invention is not limited to the embodiments. The present invention encompasses any alternatives, modifications, equivalents made within the spirit and scope of the present invention.

The specific details of the present invention are described in detail in the preferred embodiments of the present invention in order to enable the public to understand and know how the invention completely operates and functions, and the present invention can be fully understood by those skilled in the art without these descriptions of details.

The present invention is more specifically described in the following paragraphs by way of examples with reference to the accompanying drawings. It should be noted that the drawings are all in a simplified form and use non-precise proportions, and are only for convenience and clarity to assist in explaining the embodiments of the present invention.

Figure 1:
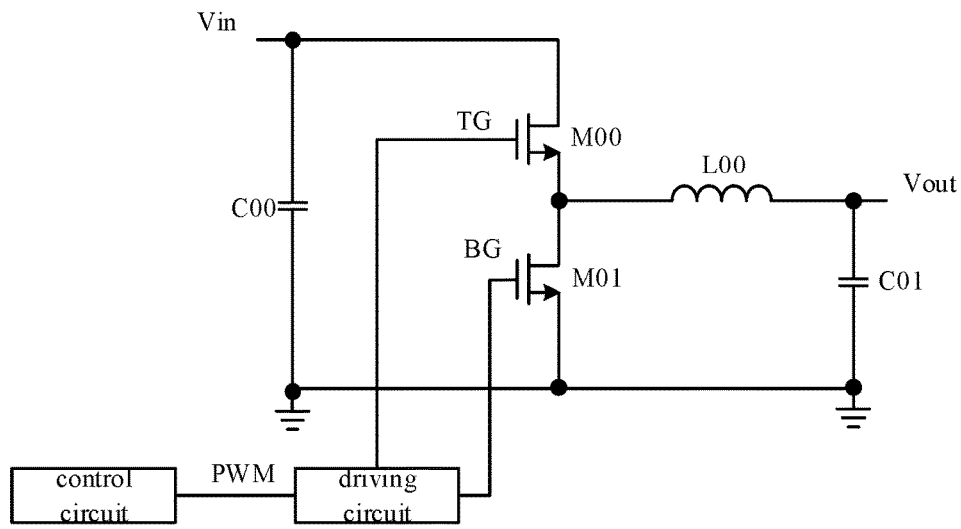
FIG. 1 is a circuit schematic diagram of a BUCK circuit with a synchronous rectifier.
Figure 2:
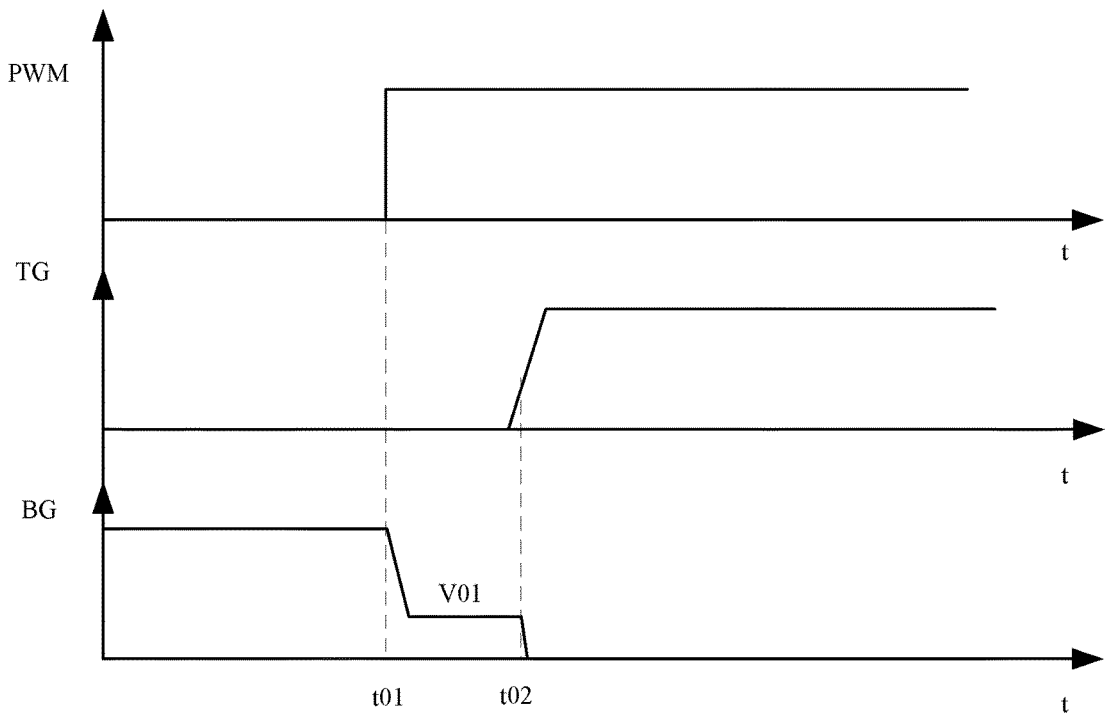
FIG. 2 is a schematic diagram showing waveforms of a switching signal PWM, a gate voltage TG of a main switching transistor, and a gate voltage BG of a synchronous rectifier according to the present invention.

The present invention provides a circuit for controlling a switching power supply circuit. The switching power supply circuit includes a main switching transistor, a synchronous rectifier and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and timing is started. When a gate voltage of the main switching transistor is detected to rise to a first voltage or the timing reaches a first time, the gate voltage of the synchronous rectifier is pulled down to the zero voltage. Taking a BUCK circuit as an example, referring to FIG. 1, which is a BUCK circuit with a synchronous rectifier. A driving circuit receives a PWM signal generated by a control circuit, and generates the gate voltage TG of the main switching transistor and the gate voltage BG of the synchronous rectifier. FIG. 2 illustrates waveforms of the switching signal PWM, the gate voltage TG of the main switching transistor and the gate voltage BG of the synchronous rectifier in the BUCK circuit. At a time t01, the gate voltage BG of the synchronous rectifier is pulled down to V01. That is, to be lower than a threshold voltage of the synchronous rectifier and higher than a zero voltage. When it is detected that the gate voltage TG of the main switching transistor rises to the first voltage, the gate voltage of the synchronous rectifier is pulled down to the zero voltage at a time t02. In another implementation, at the time t01, the gate voltage of the synchronous rectifier is pulled down to V01, and timing is started. At the time t02, when the timing reaches the first time, the gate voltage of the synchronous rectifier is pulled down to the zero voltage.

Figure 3:
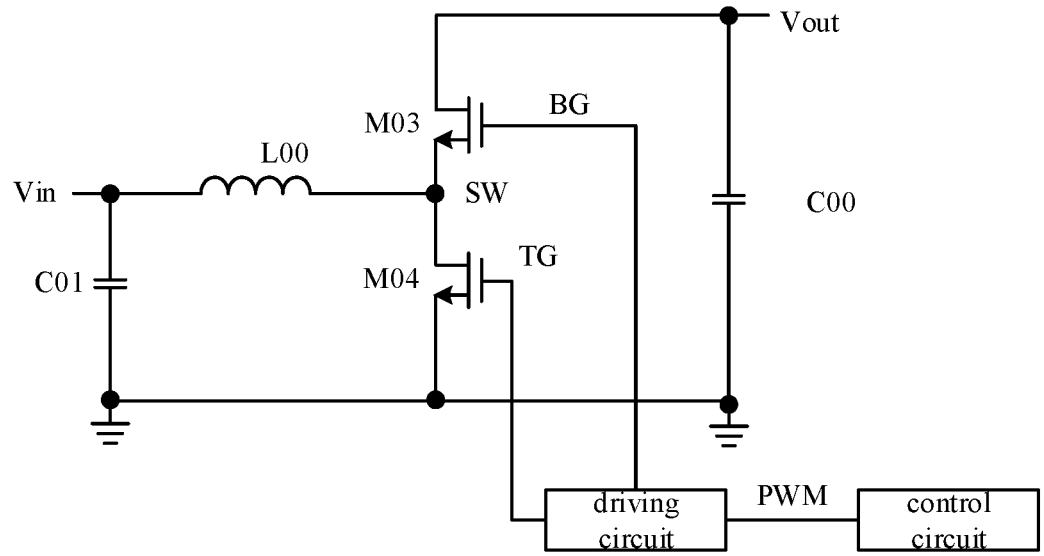
FIG. 3 is a circuit schematic diagram of a BOOST circuit in which a synchronous rectifier is NMOS.
Figure 4:
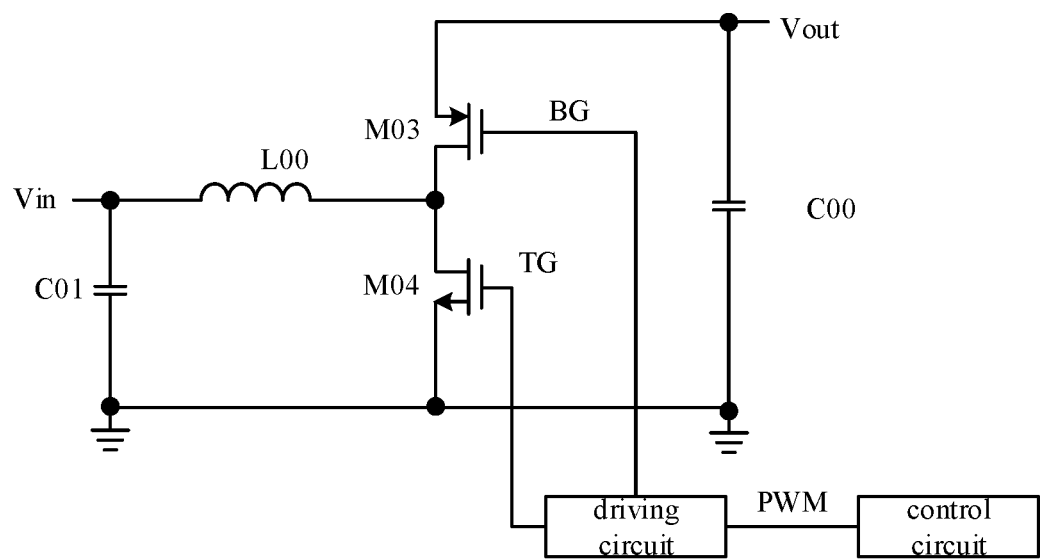
FIG. 4 is a circuit schematic diagram of a BOOST circuit in which a synchronous rectifier is PMOS.

The present invention is not limited to the BUCK circuit and can be used for any switching power supply circuit with a synchronous rectifier. For example, the present disclosure can also be used for a BOOST circuit. FIG. 3 is a BOOST circuit using NMOS as a synchronous rectifier M03. FIG. 4 is a BOOST circuit using PMOS as the synchronous rectifier M03.

Figure 5:
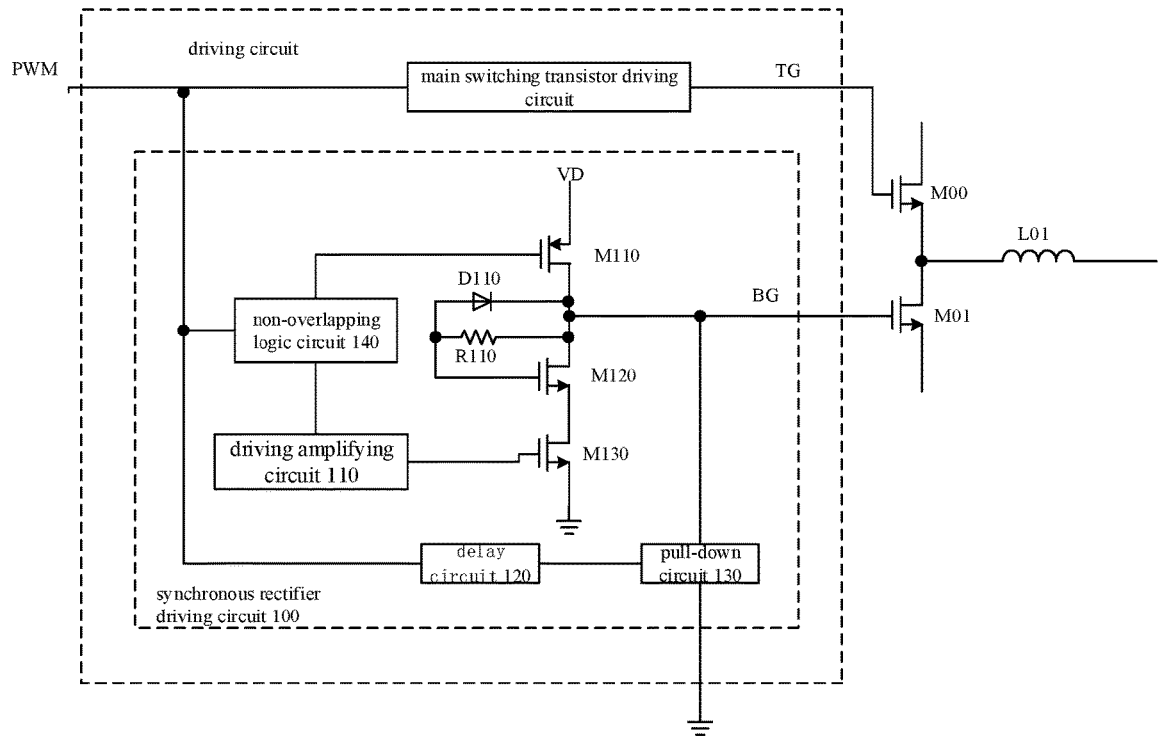
FIG. 5 is a circuit diagram of a synchronous rectifier driving circuit with a diode and a resistor according to an embodiment of the present invention.

Referring to FIG. 5, taking the BUCK circuit as an example, in one embodiment, a gate control circuit includes a synchronous rectifier driving circuit. The synchronous rectifier driving circuit includes a first transistor, a second transistor, a first resistor and a driving amplifying circuit. The gate of the synchronous rectifier is connected to a reference ground through a circuit formed by the first transistor and the second transistor connected in series, and the gate of the synchronous rectifier is connected to a control terminal of the first transistor through the first resistor.

Taking the BUCK circuit as an example, when the switching signal indicates that the synchronous rectifier is turned from on to off, and the main switching transistor is turned from off to on, the gate voltage BG of the synchronous rectifier is high, a gate of M120 is also high through the resistor R110, and a gate of M130 changes from low to high. At this time, because the gate of M120 is high, M120 and M130 will pull down the gate voltage BG of the synchronous rectifier. When a gate voltage of M120 falls to lower than a threshold voltage, the gate voltage BG of the synchronous rectifier will not be pulled down. Due to RC delay effects of gate capacitance of M120 and R110 (that is, C130 in FIG. 6), a falling speed of the gate voltage BG of the synchronous rectifier will be larger than that of the gate voltage of M120. When the gate voltage of M120 falls to the threshold voltage, the gate voltage BG of the synchronous rectifier will be lower than the threshold voltage, and thus finally the gate voltage BG of the synchronous rectifier will stay at a level of slightly lower than the threshold voltage of M120. By adjusting sizes of M120 and R110, the falling speed of the gate voltage BG of the synchronous rectifier and a final stayed plateau voltage can be controlled.

Figure 6:
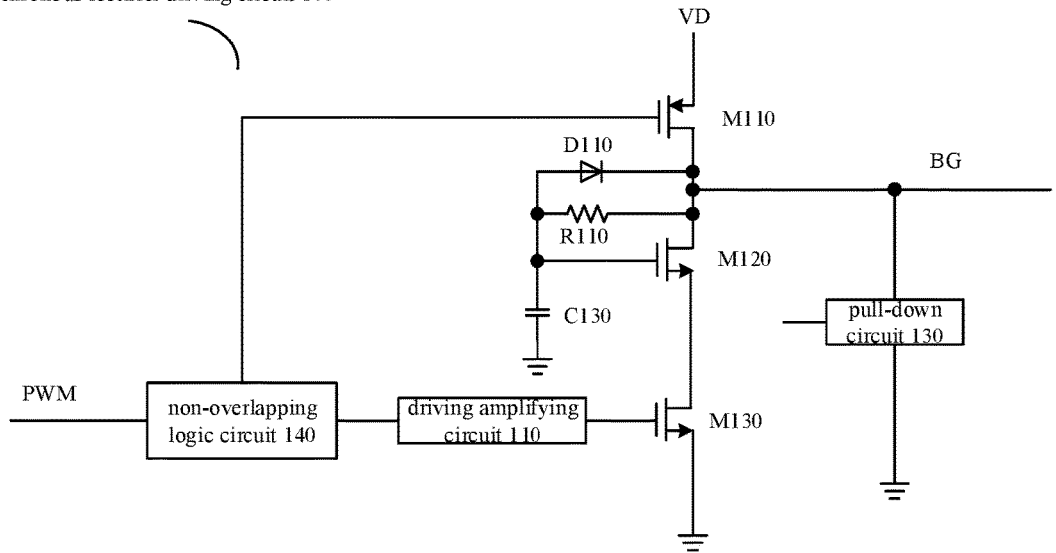
FIG. 6 is a circuit diagram of a synchronous rectifier driving circuit according to an embodiment of the present invention.

In one embodiment, referring to FIG. 6, the capacitor C130 is included. The capacitor C130 can be a gate parasitic capacitance of the first transistor M120 or an external capacitor. Therefore, a resistor-capacitor delay effect is generated between the resistor R110 and the capacitor C130. The capacitor C130 is also included in other embodiments. In order to simplify the circuit, the parasitic capacitance is always used to be equivalent to the capacitor C130. Therefore, in the following drawings, the capacitor C130 is omitted.

In one embodiment, referring to FIG. 5, the synchronous rectification driving circuit further includes the non-overlapping logic circuit 140 and a pull-up circuit. In FIG. 5, the pull-up circuit is implemented by the PMOS M110. The switching signal PWM generates driving signals of M110 and M130 which are not overlapped by the non-overlapping logic circuit 140, respectively, so that M110 and M130 are not turned on at the same time, thereby preventing a shoot-through. The pull-up circuit M110 turns on the synchronous rectifier by pulling up the BG, and M110 is turned off when the synchronous rectifier is turned off.

In one embodiment, referring to FIG. 5, the synchronous rectifier driving circuit further includes the first diode D110. An anode of the first diode is connected to the control terminal of the first transistor, and a cathode of the first diode is connected to the gate of the synchronous rectifier. The gate of M120 is pulled down through the first diode D110 while the gate voltage BG of the synchronous rectifier falls. When the gate voltage of the M120 falls to be close to the threshold voltage, the pulling down of the gate voltage BG of the synchronous rectifier becomes weak, the drop of the gate voltage BG of the synchronous rectifier tends to be flat, and the first diode D110 is no longer turned on at this time. Where the function of the first diode D110 is to speed up the falling of the gate of M120 at the beginning, otherwise the gate of M120 will fall too slowly, causing the gate voltage BG of the synchronous rectifier to discharge too fast and the final stayed plateau voltage will be too low, if the gate of M120 is pulled down only through R110.

The gate of the synchronous rectifier is connected to a reference ground through a circuit formed by the first transistor and the second transistor connected in series. The positions of the first transistor and the second transistor can be interchanged. The first transistor can be connected to the reference ground, as shown in FIG. 7, or the second transistor can be connected to the reference ground, as shown in FIG. 5.

Figure 7:
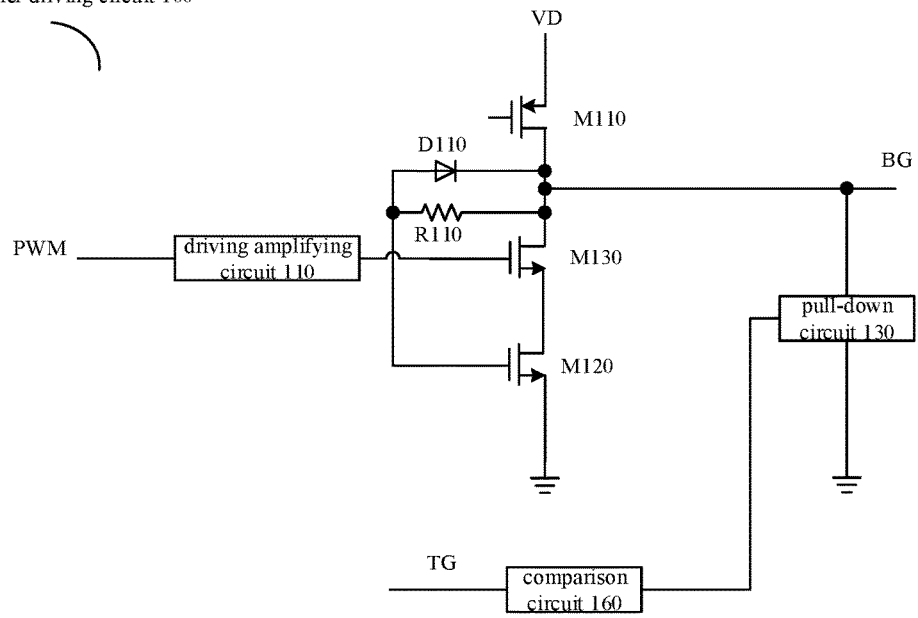
FIG. 7 is a circuit diagram of a synchronous rectifier driving circuit with a diode and a resistor according to another embodiment of the present invention.
Figure 8:
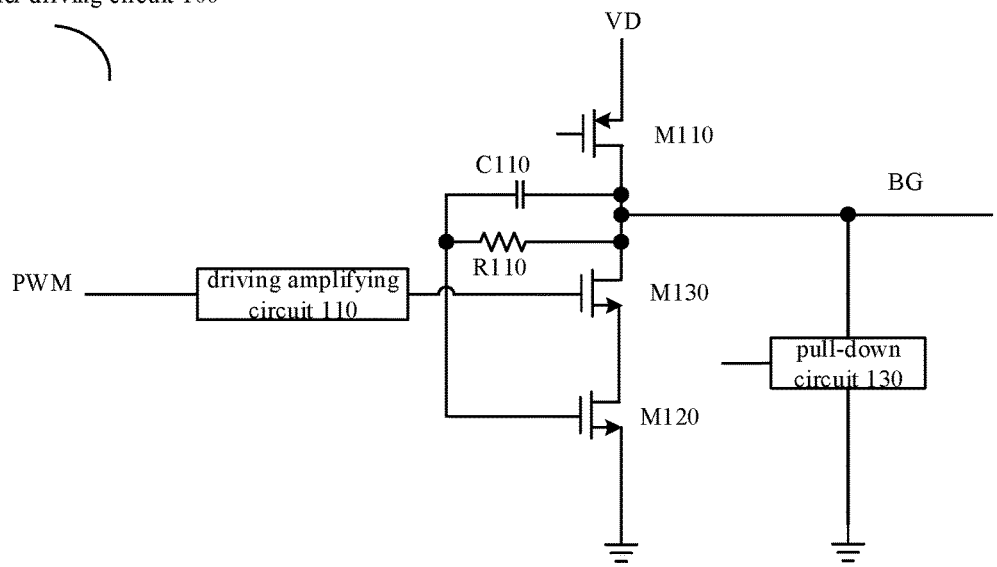
FIG. 8 is a circuit diagram of a synchronous rectifier driving circuit with a capacitor and a resistor according to an embodiment of the present invention.

In one embodiment, referring to FIG. 8, the synchronous rectifier driving circuit further includes a first capacitor. The first capacitor and the first resistor are connected in parallel. That is, the first diode D110 in FIGS. 6 and 7 can be replaced with the first capacitor C110.

In one embodiment, referring to FIG. 5, the synchronous rectification driving circuit further includes the delay circuit 120 and the pull-down circuit 130. The delay circuit 120 receives a switching signal, and the pull-down circuit 130 receives an output voltage of the delay circuit 120 and pulls down the gate of the synchronous rectifier according to the output voltage of the delay circuit 120. When the switching signal indicates that the synchronous rectifier is turned from on to off, and the main switching transistor is turned from off to on, the delay circuit 120 delays the first time, and the pull-down circuit 130 pulls down the gate of the synchronous rectifier and the synchronous rectifier is turned off.

In another embodiment, referring to FIG. 7, the synchronous rectification driving circuit further includes the comparison circuit 160 and the pull-down circuit 130. The comparison circuit 160 receives the driving signal of the main switching transistor TG, and the pull-down circuit 130 receives an output voltage of the comparison circuit 160 and pulls down the gate of the synchronous rectifier according to the output voltage of the comparison circuit 160. When the comparison circuit 160 detects that a driving voltage of the main switching transistor is higher than a first driving voltage, the pull-down circuit pulls down the gate of the synchronous rectifier and the synchronous rectifier is turned off.

The synchronous rectifier driving circuit for the BOOST circuit of FIG. 3 differs from that of FIGS. 5-8 in that the synchronous rectifier driving circuit is powered between the BST voltage and the SW voltage, rather than between the power supply terminal VD and the reference ground. BST voltage and SW voltage are maintained in a relatively stable state through the capacitor, and then the capacitor is replenished through VD when a lower transistor is turned on, so that a relatively stable supply voltage is obtained between the BST voltage and the SW voltage.

Figure 9:
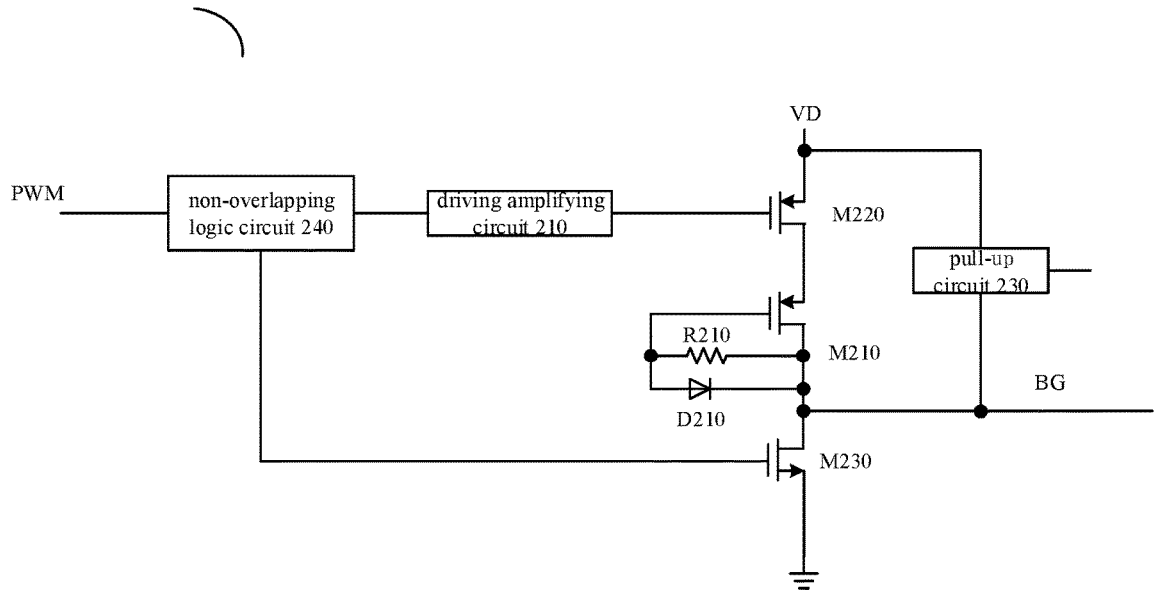
FIG. 9 is a circuit diagram of a synchronous rectifier driving circuit in which a synchronous rectifier is PMOS in a BOOST circuit according to an embodiment of the present invention.
Figure 10:
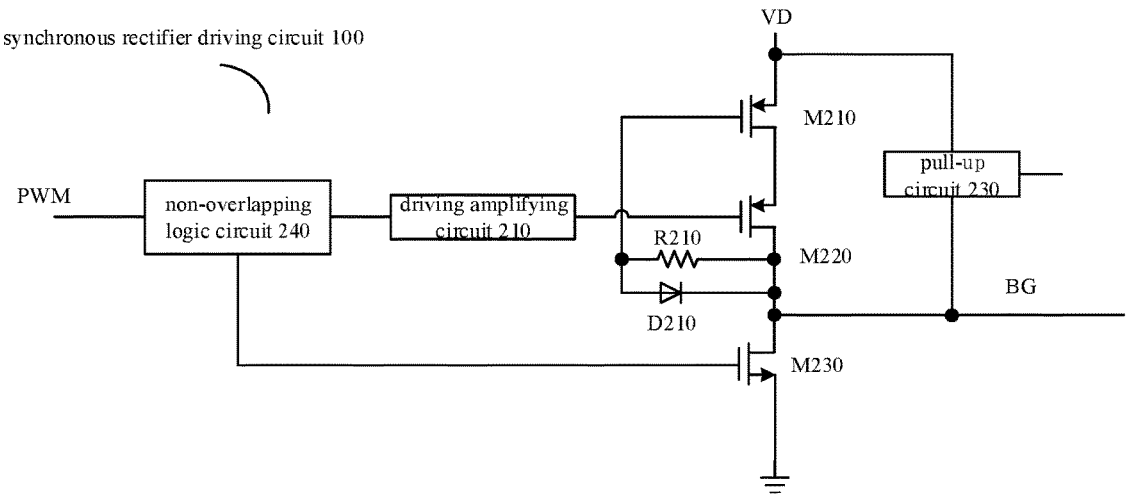
FIG. 10 is a circuit diagram of a synchronous rectifier driving circuit in which a synchronous rectifier is PMOS in a BOOST circuit according to another embodiment of the present invention.

FIG. 9 is an implementation of the synchronous rectifier driving circuit 100 of the BOOST circuit using PMOS as the synchronous rectifier. The driving circuit includes the synchronous rectifier driving circuit 100. The synchronous rectifier driving circuit 100 includes the transistor M220, the transistor M210, and the driving amplifying circuit 210. The gate BG of the synchronous rectifier is connected to the power supply terminal VD through a circuit formed by the transistor M210 and the transistor M220 connected in series. The gate BG of the synchronous rectifier is connected to a control terminal of the transistor M210 through the resistor 8210, and the switch signal PWM is connected to a gate of M220 through the driving amplifying circuit 210. When the switching signal indicates the synchronous rectifier is turned from on to off, and the main switching transistor is turned from off to on, the synchronous rectifier gate voltage is pulled up to be higher than the threshold voltage of the synchronous rectifier through the delay effects of the resistor 8210 and the gate of M220 to the capacitance of the power supply. Since M210 is PMOS, the synchronous rectifier is rendered non-conductive by pulling up the threshold voltage to be higher than the threshold voltage of the synchronous rectifier. The transistor M220 and the transistor M210 can be interchanged. In FIG. 9, M220 is connected to the power supply terminal VD, and a drain of M210 is connected to the gate BG of the synchronous rectifier. In FIG. 10, M210 is connected to the power supply terminal VD, and the drain of M220 is connected to the gate BG of the synchronous rectifier.

In one embodiment, referring to FIG. 9, the synchronous rectification driving circuit further includes the non-overlapping logic circuit 240 and a pull-down circuit. In FIG. 9, the pull-down circuit is implemented by the NMOS M230. The switching signal PWM generates driving signals of M220 and M230 which are not overlapped by the non-overlapping logic circuit 240, respectively, so that M220 and M230 are not turned on at the same time, thereby preventing a shoot-through. The pull-down circuit M230 turns on the synchronous rectifier by pulling down the BG, and M230 is turned off when the synchronous rectifier is turned off.

The technical solution of the present invention is to provide a method for controlling a switching power supply circuit. The switching power supply circuit includes a main switching transistor, a synchronous rectifier and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and timing is started. When a gate voltage of the main switching transistor is detected to rise to a first voltage or the timing reaches a first time, the gate voltage of the synchronous rectifier is pulled down to the zero voltage.

Alternatively, when the switching signal indicates that the synchronous rectifier is turned from on to off, and the main switching transistor is turned from off to on, the gate voltage of the synchronous rectifier is pulled down to be close to and lower than the threshold voltage of the synchronous rectifier.

Alternatively, a gate of the synchronous rectifier is connected to a reference ground through a circuit formed by a first transistor and a second transistor connected in series, and the gate of the synchronous rectifier is connected to a control terminal of the first transistor through a first resistor.

Alternatively, a first capacitor is connected in parallel with the first resistor, or an anode of a first diode is connected to the control terminal of the first transistor and a cathode of the first diode is connected to the gate of the synchronous rectifier.

Although the embodiments have been described and illustrated separately in the foregoing, it can be seen from those skilled in the art elements and devices be replaced and integrated among the embodiments. For a content that is not explicitly described in one of the embodiments, it can be referred to another embodiment where it is described. The embodiments described above do not constitute a limitation on the scope of protection of the technical solutions. Any modifications, equivalent substitutions and improvements made within the spirit and principles of the above-described embodiments are intended to be included within the scope of the technical solutions.

What is claimed is:

1. A circuit for controlling a switching power supply circuit, wherein the switching power supply circuit comprises a main switching transistor, a synchronous rectifier and an inductive element, when a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and a timing is started; when a gate voltage of the main switching transistor is detected to rise to a first voltage or the timing reaches a first time, the gate voltage of the synchronous rectifier is pulled down to the zero voltage; and further comprising:
a synchronous rectifier driving circuit, wherein the synchronous rectifier driving circuit comprises a first transistor, a second transistor, a first resistor and a driving amplifying circuit, a gate of the synchronous rectifier is connected to a reference ground through a circuit formed by the first transistor and the second transistor connected in series, and the gate of the synchronous rectifier is connected to a control terminal of the first transistor through the first resistor;
wherein the synchronous rectification driving circuit further comprises a delay circuit and a pull-down circuit; the delay circuit receives the switching signal, and the pull-down circuit receives an output voltage of the delay circuit and pulls down the gate of the synchronous rectifier according to the output voltage of the delay circuit; wherein when the switching signal indicates that the synchronous rectifier is turned from on to off, and the main switching transistor is turned from off to on, the delay circuit delays the first time, and the pull-down circuit pulls down the gate of the synchronous rectifier.

2. The circuit for controlling the switching power supply circuit according to claim 1, wherein the synchronous rectifier driving circuit further comprises a first capacitor or a first diode, the first capacitor is connected in parallel with the first resistor, or an anode of the first diode is connected to the control terminal of the first transistor and a cathode of the first diode is connected to the gate of the synchronous rectifier.

3. A switching power supply circuit comprising the circuit for controlling the switching power supply circuit according to claim 1.

4. The switching power supply circuit according to claim 3, wherein the circuit further comprises a synchronous rectifier driving circuit, wherein the synchronous rectifier driving circuit comprises a first transistor, a second transistor, a first resistor and a driving amplifying circuit, a gate of the synchronous rectifier is connected to a reference ground through a circuit formed by the first transistor and the second transistor connected in series, and the gate of the synchronous rectifier is connected to a control terminal of the first transistor through the first resistor.

5. The switching power supply circuit according to claim 4, wherein the synchronous rectifier driving circuit further comprises a first capacitor or a first diode, the first capacitor is connected in parallel with the first resistor, or an anode of the first diode is connected to the control terminal of the first transistor and a cathode of the first diode is connected to the gate of the synchronous rectifier.

6. The switching power supply circuit according to claim 4, wherein the synchronous rectification driving circuit further comprises a delay circuit and a pull-down circuit; the delay circuit receives the switching signal, and the pull-down circuit receives an output voltage of the delay circuit and pulls down the gate of the synchronous rectifier according to the output voltage of the delay circuit; wherein when the switching signal indicates that the synchronous rectifier is turned from on to off, and the main switching transistor is turned from off to on, the delay circuit delays the first time, and the pull-down circuit pulls down the gate of the synchronous rectifier.

7. The switching power supply circuit according to claim 4, wherein the synchronous rectification driving circuit further comprises a comparison circuit and a pull-down circuit; the comparison circuit receives a driving signal of the main switching transistor, and the pull-down circuit receives an output voltage of the comparison circuit and pulls down the gate of the synchronous rectifier according to the output voltage of the comparison circuit; wherein when the comparison circuit detects that a driving voltage of the main switching transistor is higher than a first driving voltage, the pull-down circuit pulls down the gate of the synchronous rectifier.

8. A circuit for controlling a switching power supply circuit, wherein the switching power supply circuit comprises a main switching transistor, a synchronous rectifier and an inductive element, when a switching signal indicates that the synchronous rectifier is turned from on to off, and the main switching transistor is turned from off to on, a gate voltage of the synchronous rectifier is pulled down to be lower than a threshold voltage of the synchronous rectifier and higher than a zero voltage by using a resistor-capacitor delay effect, and a timing is started; when a gate voltage of the main switching transistor is detected to rise to a first voltage or the timing reaches a first time, the gate voltage of the synchronous rectifier is pulled down to the zero voltage; and further comprising:
   a synchronous rectifier driving circuit, wherein the synchronous rectifier driving circuit comprises a first transistor, a second transistor, a first resistor and a driving amplifying circuit, a gate of the synchronous rectifier is connected to a reference ground through a circuit formed by the first transistor and the second transistor connected in series, and the gate of the synchronous rectifier is connected to a control terminal of the first transistor through the first resistor;
   wherein the synchronous rectification driving circuit further comprises a comparison circuit and a pull-down circuit; the comparison circuit receives a driving signal of the main switching transistor, and the pull-down circuit receives an output voltage of the comparison circuit and pulls down the gate of the synchronous rectifier according to the output voltage of the comparison circuit; wherein when the comparison circuit detects that a driving voltage of the main switching transistor is higher than a first driving voltage, the pull-down circuit pulls down the gate of the synchronous rectifier.

* * * * *